US008619121B2

(12) United States Patent
Pockett

(10) Patent No.: US 8,619,121 B2
(45) Date of Patent: Dec. 31, 2013

(54) METHOD AND DEVICES FOR GENERATING, TRANSFERRING AND PROCESSING THREE-DIMENSIONAL IMAGE DATA

(75) Inventor: Lachlan Pockett, Tampere (FI)

(73) Assignee: Nokia Corporation, Espoo (FI)

( * ) Notice: Subject to any disclaimer, the term of this patent is extended or adjusted under 35 U.S.C. 154(b) by 886 days.

(21) Appl. No.: 12/085,124

(22) PCT Filed: Nov. 17, 2005

(86) PCT No.: PCT/FI2005/000491
§ 371 (c)(1),
(2), (4) Date: Aug. 1, 2009

(87) PCT Pub. No.: WO2007/057497
PCT Pub. Date: May 24, 2007

(65) Prior Publication Data
US 2009/0295790 A1    Dec. 3, 2009

(51) Int. Cl.
*H04N 13/00*    (2006.01)
(52) U.S. Cl.
USPC .................. 348/42; 348/46; 348/50; 348/51
(58) Field of Classification Search
USPC .......................................... 348/42, 46, 50, 51
See application file for complete search history.

(56) References Cited

U.S. PATENT DOCUMENTS

| | | | | |
|---|---|---|---|---|
| 5,175,616 | A * | 12/1992 | Milgram et al. | 348/47 |
| 5,179,441 | A * | 1/1993 | Anderson et al. | 348/43 |
| 6,163,337 | A * | 12/2000 | Azuma et al. | 348/43 |
| 6,512,892 | B1 | 1/2003 | Montgomery et al. | |
| 7,835,568 | B2 * | 11/2010 | Park et al. | 382/154 |
| 2001/0038413 | A1 * | 11/2001 | Peleg et al. | 348/36 |
| 2003/0035001 | A1 * | 2/2003 | Van Geest et al. | 345/753 |

(Continued)

FOREIGN PATENT DOCUMENTS

| | | |
|---|---|---|
| EP | 1089573 | 4/2001 |
| EP | 1408703 | 4/2004 |

(Continued)

OTHER PUBLICATIONS

Ohm, et al; "A realtime hardware system for stereoscopic videoconferencing with viewpoint adaptation"; Singla Processing, Image Communication, Elsevier Science Publishers, Amsterdam, NL, vol. 14, No. 1-2, Nov. 6, 1998, pp. 147-171, ISSN: 0923-5965, p. 2, right-hand column, lines 1-21; p. 3, paragraph 2, Figures 1-2; p. 4, paragraphs 2 and 3, and Figure 3; p. 5, left-hand column, lines 1-34; p. 8, paragraph 3.3; pp. 10-11, paragraph 4-4.1.

(Continued)

*Primary Examiner* — Liangche A Wang
(74) *Attorney, Agent, or Firm* — Alston & Bird LLP

(57) ABSTRACT

Three-dimensional digital image data comes from a stereographic imaging arrangement (501, 502, 1201) that takes a first raw image (601) along a first optical axis and a second raw image (602) along a second optical axis. The imaging arrangement (501, 502, 1201) has a maximum imaging depth (506) and a minimum imaging depth (505). It transmits the first raw image (601) and the second raw image (602) to a receiving device (1102) along with an indication of a disparity range between a maximum disparity value and a minimum disparity value. The maximum disparity value is a measure of a difference between locations in the first (601) and second (602) raw images that represent the minimum imaging depth (505). The minimum disparity value is a measure of a difference between locations in the first (601) and second (602) raw images that represent the maximum imaging depth (506).

42 Claims, 6 Drawing Sheets

(56) References Cited

U.S. PATENT DOCUMENTS

| | | | |
|---|---|---|---|
| 2003/0204384 A1* | 10/2003 | Owechko et al. | 703/1 |
| 2004/0218269 A1* | 11/2004 | Divelbiss et al. | 359/464 |
| 2004/0223640 A1* | 11/2004 | Bovyrin | 382/154 |
| 2004/0233275 A1 | 11/2004 | Tomita | |
| 2005/0201591 A1* | 9/2005 | Kiselewich | 382/104 |
| 2006/0290778 A1 | 12/2006 | Kitaura et al. | |

FOREIGN PATENT DOCUMENTS

| | | |
|---|---|---|
| JP | 08-009421 A | 1/1996 |
| JP | 10-032840 A | 2/1998 |
| JP | 11-027703 A | 1/1999 |
| JP | 2001-142166 A | 5/2001 |
| JP | 2004-349736 A | 12/2004 |
| JP | 2005-026800 A | 1/2005 |
| JP | 2005-073049 A | 3/2005 |

OTHER PUBLICATIONS

Office Action for Japanese Application No. 2008-540634 dated Mar. 22, 2011.

Office Action for Japanese Application No. 2008-540634 dated Mar. 6, 2012.

* cited by examiner

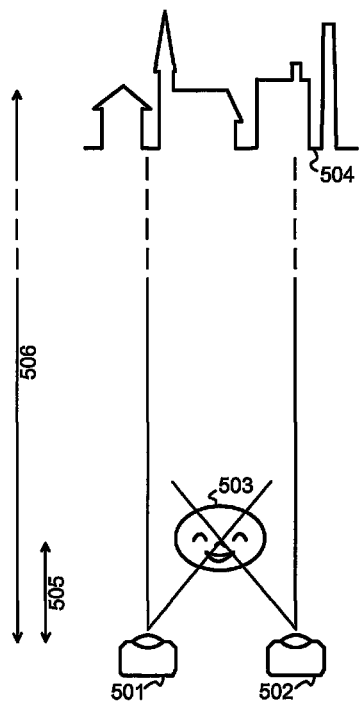
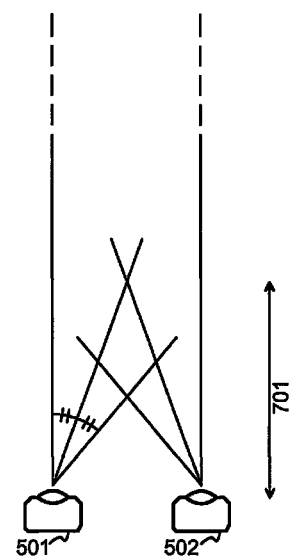
Fig. 5         Fig. 7
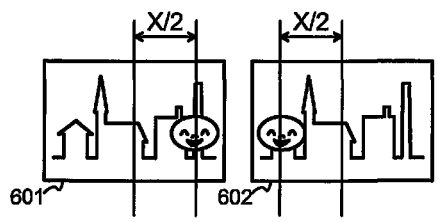
Fig. 6

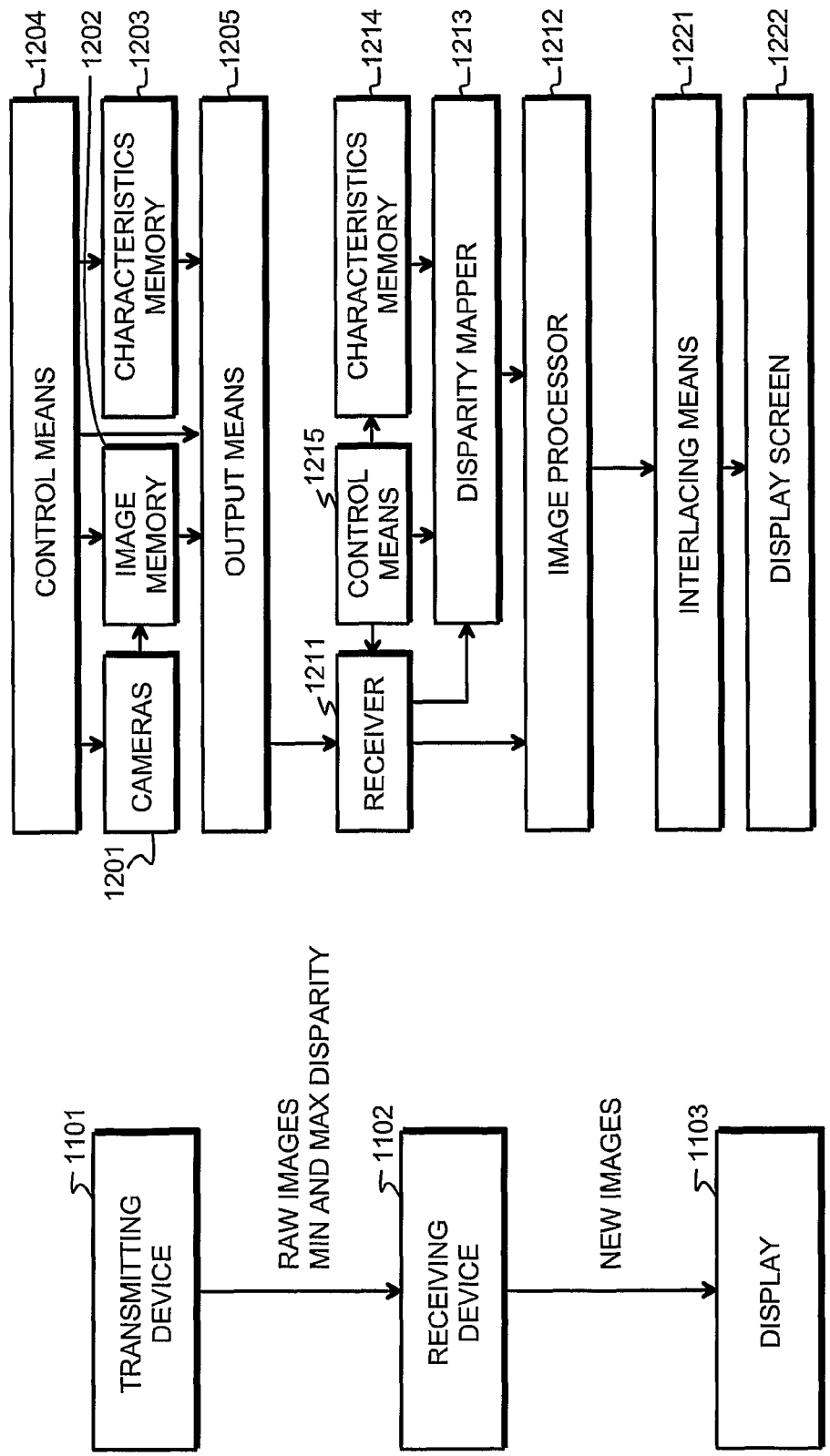

METHOD AND DEVICES FOR GENERATING, TRANSFERRING AND PROCESSING THREE-DIMENSIONAL IMAGE DATA

CROSS REFERENCE TO RELATED APPLICATIONS

This application is the U.S. National Stage of International Application Number PCT/FI2005/000491 filed on Nov. 17, 2005 which was published in English on May 24, 2007 under International Publication Number WO 2007/057497.

TECHNICAL FIELD

The invention concerns generally the technology of obtaining, transferring and outputting three-dimensional image data. Especially the invention concerns the problem of transferring three-dimensional image data in a form that allows it to be displayed with any display device.

BACKGROUND OF THE INVENTION

The visual system of the brain produces a perception of three-dimensionality by combining the two slightly different images coming from the eyes. An image displayed on a two-dimensional display screen can give rise to the same perception without the need of special viewing glasses or the like, if the display screen is autostereoscopic, i.e. in itself capable of emitting slightly different information to the right and left eye of the viewer. The two autostereoscopic display technologies that are most widely used for this purpose at the time of writing this specification are known as the parallax barrier principle and the lenticular principle, although also other approaches are known as well.

FIG. 1 is a simple schematic example of a known parallax barrier type liquid crystal display. A liquid crystal layer 101 comprises right-eye subpixels and left-eye subpixels marked with R and L respectively. A backlighting layer 102 emits light from behind the liquid crystal display. A parallax barrier layer 103 contains slits that only allow light to propagate through the right-eye subpixels to the right eye of the viewer and through the left-eye subpixels to the left eye of the viewer. It is also possible to have the parallax barrier layer 103 in front of the liquid crystal layer 101 instead of between it and the backlighting layer 102.

FIG. 2 is a simple schematic example of a known lenticular type liquid crystal display. Also here the liquid crystal layer 201 comprises right-eye subpixels and left-eye subpixels. The backlighting layer 202 emits light through the liquid crystal layer 201. A layer 203 of lenticulars, i.e. cylindrical lenses, collimates the light so that light rays coming through a right-eye subpixel continue parallelly towards the right eye of the viewer and light rays coming through a left-eye subpixel continue parallelly towards the left eye of the viewer.

FIG. 3 illustrates schematically a known principle for generating three-dimensional image information of a group of imaged objects. Two horizontally separated cameras 301 and 302 take pictures at the same time but otherwise independently of each other, resulting in two so-called raw images 303 and 304 respectively. Images of the objects appear at different locations in the raw images, because the cameras 301 and 302 see the imaged objects from different directions. It should be noted, though, that the differences in the raw images appear in highly exaggerated proportion in FIG. 3 compared to most practical solutions, because for reasons of making FIG. 3 graphically clear the imaged objects are drawn very close to the camera arrangement. Together the raw images 303 and 304 constitute a stereograph that could be displayed using any suitable display technology, including but not being limited to those illustrated in FIGS. 1 and 2.

There are no widespread standards that would define the parameters that affect the generation of stereographs or their presentation on display screens. Numerous parameters have a significant effect, such as the separation between cameras; focal length; size, resolution and angular pixel pitch of the CCD (Charge-Coupled Device) arrays in the cameras; size, resolution and pixel structure of the display; default viewing distance; and the amount of scaling, cropping and other processing that is required to map the raw images to the subpixel arrays, time-interlaced fields or other display elements that eventually present the fused image to the viewer. The lack of standards means that a stereographic image taken with a certain imaging arrangement and prepared for presentation on a particular display type is not likely to work well on any other display type.

The incompatibility problem will become more and more important when three-dimensional imaging and autostereoscopic displays find their way to simple and inexpensive consumer appliances, such as portable communication devices, where conventional cameras and high-quality two-dimensional displays are already in widespread use. A user that has taken a three-dimensional image with a portable communication device of one brand wants to be sure that he can transmit the image to another user, who can view it correctly irrespective of which brand of a device the recipient has.

A US patent publication number US 2004/0218269 A1 discloses a 3D Data Formatter, which acts as a format converter between various known interlacing techniques and is also capable of certain basic picture processing operations, such as zooming, cropping and keystone correcting. Simply changing between presentation formats does not solve the problem of inherent incompatibility between displays that may be of different size and may have a different default viewing distance. A weakness of the reference publication is also that the solution considered therein can only work between formats and interlacing techniques that the formatter device knows in advance. The reference publication does not consider any way of generating good fusible 3D image content for any receiving device, the features of which are not yet known.

SUMMARY OF THE INVENTION

An objective of the present invention is to present a method and devices for generating, transferring and processing three-dimensional image data in a form that does not require ensuring compatibility between the imaging arrangement and the displaying arrangement in advance. Another objective of the present invention is to enable efficient transfer of generic three-dimensional image content.

The objectives of the invention are achieved by recording a disparity range that describes limits of how much the raw images differ from each other, and rescaling the disparities related to different viewing depths to map the three-dimensional image into a comfortable viewing space between the maximum virtual distances in front of and behind the display at which objects in the image should appear.

A transmitting device according to the invention is characterized by the features recited in the characterizing part of the independent claim directed to a transmitting device.

An imaging module according to the invention is characterized by the features recited in the characterizing part of the independent claim directed to an imaging module.

A receiving device according to the invention is characterized by the features recited in the characterizing part of the independent claim directed to a receiving device.

A transmission system according to the invention is characterized by the features recited in the characterizing part of the independent claim directed to a transmission system.

A transmitting method according to the invention is characterized by the features recited in the characterizing part of the independent claim directed to a transmitting method.

A receiving method according to the invention is characterized by the features recited in the characterizing part of the independent claim directed to a receiving method.

Software program products for a transmission operation and a reception operation according to the invention are characterized by the features recited in the characterizing part of the independent claims directed such software program products.

Embodiments of the invention are described in the depending claims.

Objects that appear in a three-dimensional image are located at various distances from the imaging arrangement. The distance between the imaging arrangement and an imaged object is commonly referred to as the imaging depth. We may reasonably assume that there are minimum and maximum limits to imaging depth: for example, all imaged objects must appear between half a meter and infinity. The structural parameters of the camera arrangement determines, what is the disparity between raw images related to each imaging depth value. The disparities related to the minimum imaging depth and the maximum imaging depth define a disparity range that is characteristic to each particular imaging arrangement.

The disparity range can be recorded, stored and transmitted together with a pair of raw images. An autostereographic display that is to be used for fusing the raw images into a three-dimensional image has a characteristic comfortable viewing space, which extends from a virtual front edge in front of the display screen to a virtual back edge behind the display screen. By suitably scaling and shifting the disparities between the raw images it is possible to find new disparities that make the fused image appear within the comfortable viewing space: objects that were located at the maximum depth from the imaging arrangement are mapped to the back edge of the comfortable viewing space, and objects that were located at the minimum depth are mapped to the front edge.

Since the limits of the comfortable viewing space depend partly on the personal preferences of each user, there should be a possibility of dynamically modifying them. The invention makes this particularly easy, because how much in front of or behind the plane of the display screen objects seem to appear depends directly on the corresponding disparity between the component images. If the user wants to e.g. shift the front edge of the comfortable viewing space towards the plane of the display screen, he simply tells the displaying device to decrease the corresponding maximum disparity value.

An important advantage of the invention is its adaptability to automatically and instantly display images on autostereographic displays of various sizes. An image may be viewed on a small-size autostereographic display of a portable communications device or a display screen of a personal computer, or even on a giant screen of a 3D cinema system. According to the invention, the same transmission format (raw images+ disparity range) can be used to transmit a stereographic image to all these purposes, so that only some disparity mapping is needed to adapt the image for displaying in each case. The invention allows flexible content sharing and seamless interaction between all kinds of devices, portable and non-portable, that are capable of displaying stereographic images.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 5 illustrates an imaging arrangement imaging a close object and a distant object, FIG. 6 illustrates a pair of raw images, FIG. 7 illustrates certain angular relations, FIG. 11 illustrates the transmission between a transmitting device, a receiving device and a display, FIG. 12 illustrates an exemplary composition of functional blocks in the transmitting device, the receiving device and the display.

DETAILED DESCRIPTION

Figure 1:
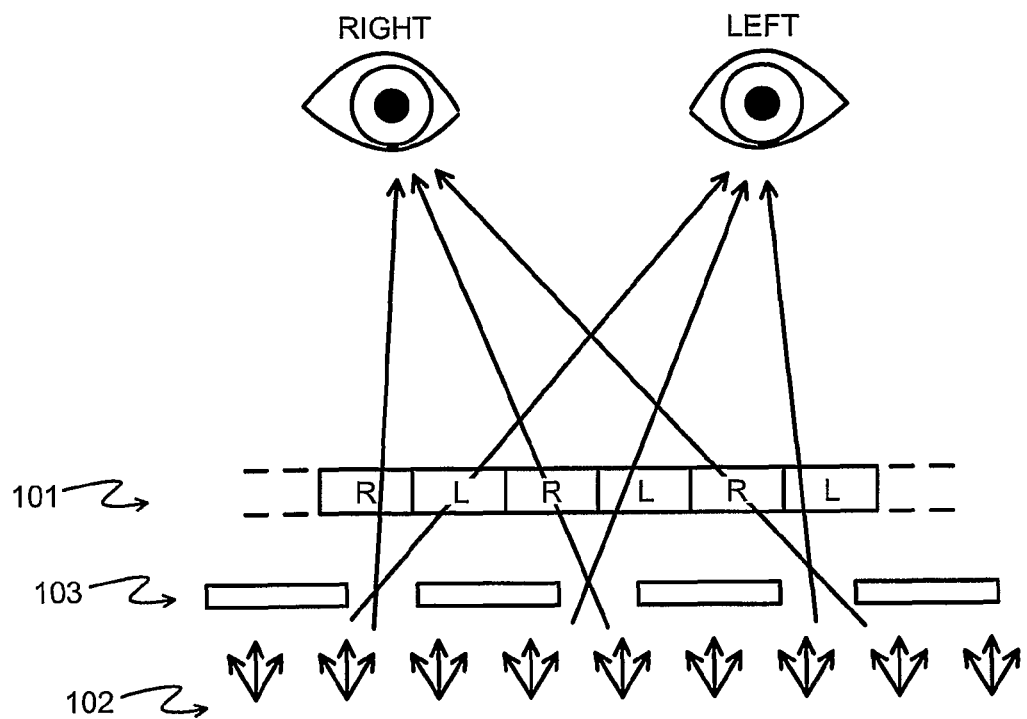
FIG. 1 illustrates a known parallax barrier display principle.
Figure 2:
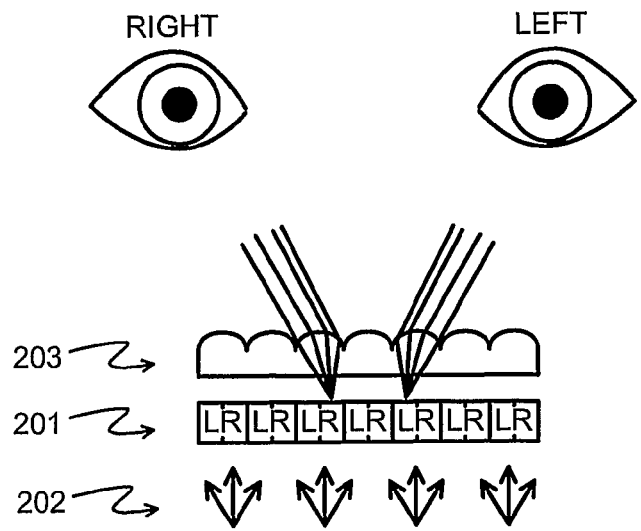
FIG. 2 illustrates a known lenticular display principle.
Figure 3:
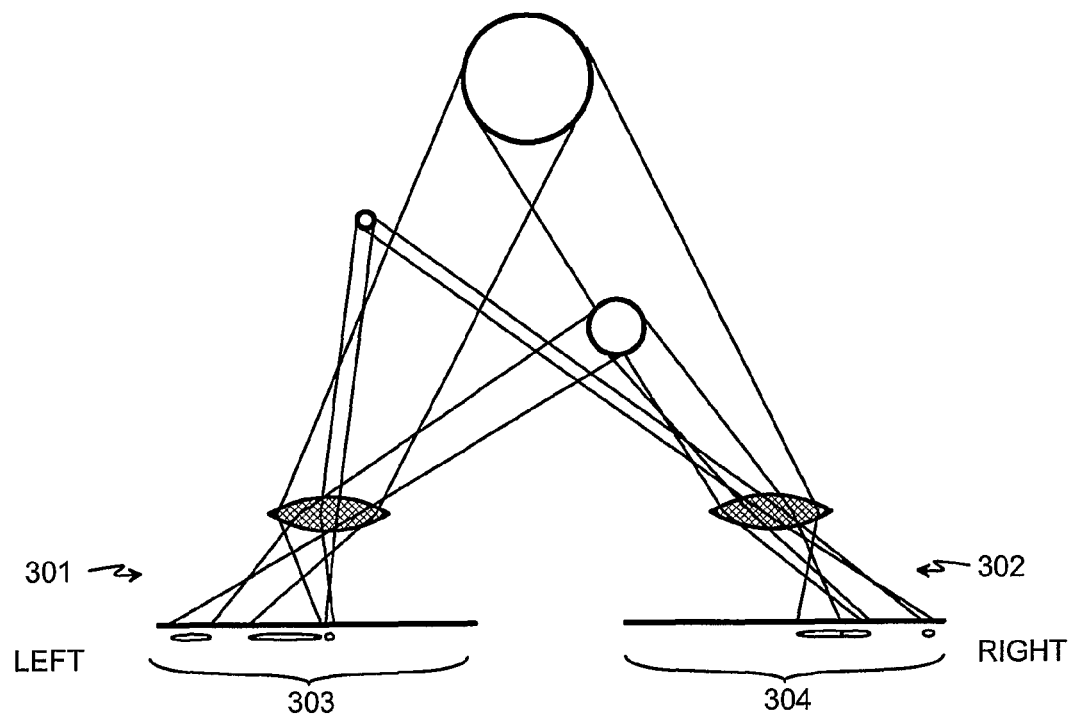
FIG. 3 illustrates the known principle of producing a stereographic image
Figure 4:
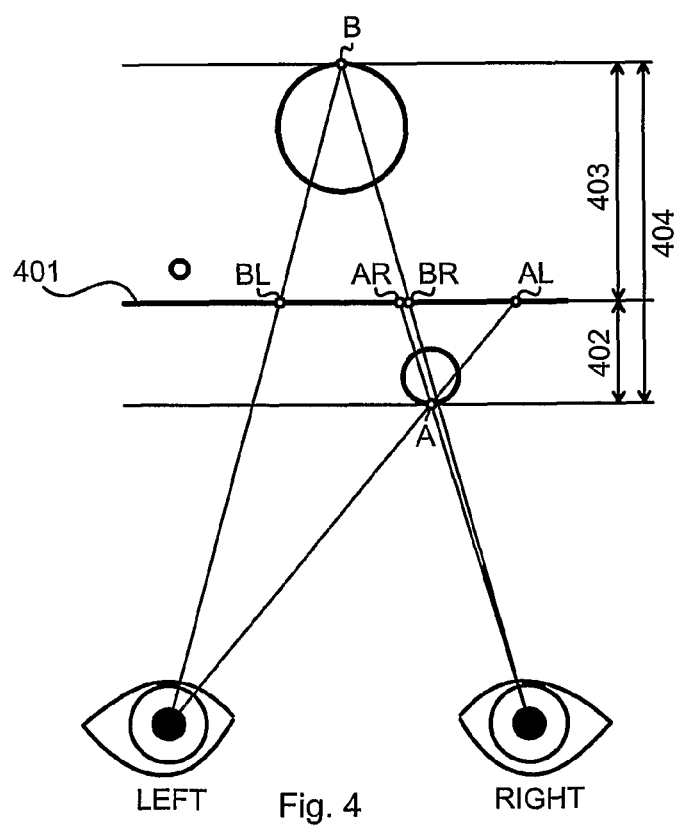
FIG. 4 illustrates the concept of comfortable viewing space.

FIG. 4 illustrates schematically how the three-dimensional image taken in FIG. 3 could appear to a viewer on an autostereographic display screen 401. We assume for simplicity that the imaged objects are transparent bubbles. In order to correctly display point A in the image, the corresponding right-eye subpixel should appear at AR and the corresponding left-eye subpixel should appear at AL. Point A is the point of the imaged objects that was closest to the camera arrangement, so in the displayed image it appears closest to the viewer. In order to correctly display the most distant point B in the image, the corresponding right-eye and left-eye subpixels should appear at BR and BL respectively.

Point A appears to be virtually located at a distance 402 in front of the display screen 401, and point B appears to be virtually located at a distance 403 behind the display screen 401. How large are the distances 402 and 403 depends on the disparity between AR and AL as well as BR and BL respectively as well as on the viewing distance (the distance between the eyes of the viewer and the display screen). For reasons of human visual ergonomy, it is not possible to stretch the distances 402 and 403 more than certain limits that depend on the size of the display screen as well as on the default viewing distance. For example, when looking at point A, the viewer's eyes should focus at the distance of the display screen 401 but converge on a point that is closer by the amount of distance 402, which contradicts the normal rules of operation of the human visual system. There are no globally valid maximum values for the distances 402 and 403 in FIG. 4: what a viewer considers comfortable is after all a matter of personal taste.

Generally we may define the concept of a comfortable viewing space so that it extends from the maximum distance in front of the display screen where objects of the three-dimensional image may be made to virtually appear to the maximum distance behind the display screen where objects of the three-dimensional image may be made to virtually appear, so that said features of human visual ergonomy still allow said objects to be viewed comfortably. Assuming that the three-dimensional image has been made to utilize the whole depth of the comfortable viewing space in FIG. 4, we may denote the depth of the comfortable viewing space as distance 404. Experiments have shown that for a display screen of a portable communications device, the default viewing distance of which is in the order of 40-60 cm, an upper limit of the disparity between AR and AL—or between BR and BL—is in the order of a few millimeters, but depends remarkably on the exact type and size of the display. At the time of writing this description there are portable-device-sized displays in which the disparity should not be more than about ±2 mm, but also some in which it can be conveniently about ±10 mm. The plus or minus sign comes from the fact that for close objects the right-eye subpixel should be more to the left than the left-eye subpixel (see AR vs. AL) while for distant objects the left-eye subpixel should be more to the left than the right-eye subpixel (see BL vs. BR).

Features of the display screen have a major effect on how far in front of the display screen and how far behind the display screen the comfortable viewing space will reach. Said features include factors like size and shape of the display; the default viewing distance; the size, shape and distribution of pixels; the sharpness and resolution of the display; reverse half occlusions (resulting from foreground objects being cut by a window that is perceived behind the object) and the structure and operation of the autostereography mechanism. Thus it is possible to determine for each displaying device certain default values for distances 402 and 403 that set the comfortable viewing space at a default location in relation to the display screen. Since the question of comfortable viewing is ultimately subjective and depends on personal taste, it is advantageous to allow the default values to be changed according to user preferences.

Having defined the comfortable viewing space we consider in more detail the concept of disparity between left-eye and right-eye subimages. FIG. 5 illustrates an imaging arrangement in which two horizontally separated cameras 501 and 502 each take a picture of a scenery that comprises a very close object 503 and a very distant object (or background) 504. We assume that minimum and maximum imaging depths have been defined for the imaging arrangement, and that the close object 503 happens to be exactly at the minimum imaging depth 505 while the distant object 504 happens to be at the maximum imaging depth 506. For excluding possible ambiguities, it is useful to define the minimum imaging depth 505 and the maximum imaging depth 506 along a central axis of the imaging arrangement. It should also be noted that the minimum imaging depth 505 and the maximum imaging depth 506 are features of the imaging arrangement and not features of any particular image, even if in the exemplary case of FIG. 5 the objects 503 and 504 happen to be located at exactly the minimum and maximum imaging depths respectively.

The optical axes of the cameras 501 and 502 are parallel to each other in FIG. 5, which means that the central axis mentioned above is an imaginary line that is parallel to the optical axes and located in the middle between them. It has been found that using parallel cameras rather than converged ones, the optical axes of which would intersect at some default imaging depth, produces superior image quality. Since the maximum imaging depth has been set at infinity in FIG. 5, mathematically speaking this is the same as using converged cameras with just the optical axis intersection point taken to infinity. Thus, no contradiction is caused by saying that the optical axes of the cameras 501 and 502 intersect at the maximum imaging depth. An important consequence thereof is that an object 504 located at the maximum imaging depth 506 has zero disparity in the raw images 601 and 602 illustrated in FIGS. 6a and 6b. In other words, the distant object appears at the same horizontal location in each raw image. To be very exact, there is a small but finite horizontal difference because even a distant object is never truly at infinite distance, but for practical considerations we may neglect the small difference for the time being.

Other values than zero for minimum disparity are possible either so that the cameras are converged, meaning that objects that are more distant than the intersecting point of the optical axes will have a negative disparity, or so that for some reason related to e.g. lighting or focusing possibilities it is practical to define maximum imaging depth to be considerably less than infinity. In the last-mentioned case the minimum disparity will have a small positive value.

The close object 503 does not appear at the same horizontal location in the raw images. In the left-hand raw image 601 it appears X/2 units to the right from the center of the raw image. Since the close object 503 was centered on the imaginary central axis between the optical axes of the cameras, in the right-hand raw image it appears correspondingly X/2 units to the left from the center. The close object 503 was located at the predefined minimum imaging depth 505, so we may say that the disparity X between its appearances in the raw images 601 and 602 is the maximum disparity. All disparity values associated with intermediate objects would fall between the maximum disparity X and the minimum disparity 0, which latter value could be denoted with Y. Speaking in angular terms, X/2 which is one half of the maximum disparity corresponds to an angular separation between the optical axis of a camera and a line drawn from the camera to a centrally located object at the minimum imaging depth.

Figure 8:
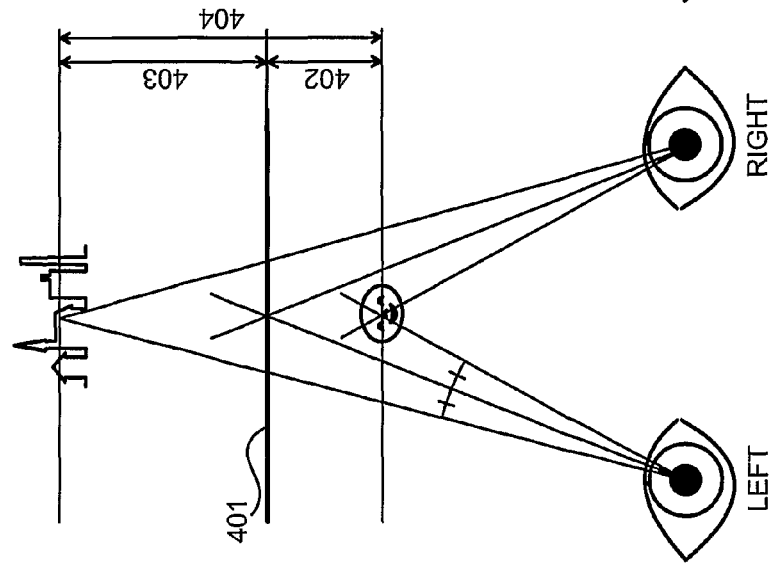
FIG. 8 illustrates mapping the virtual appearance of the close and distant objects to the comfortable viewing space.

The purpose is to map the eventually resulting three-dimensional image to the comfortable viewing space of a display so that the closest objects in the image will virtually appear in front of the display screen and the most distant objects will virtually appear behind the display screen. How should one decide, what object (if any) should virtually appear exactly in the plane of the display screen? Generally speaking that could be decided quite freely, but FIGS. 7 and 8 illustrate at least one alternative that holds for displays for which the maximum absolute value of disparity is the same for objects appearing virtually in front of the screen and objects appearing virtually behind the screen.

The basic principle is that objects that were exactly at the minimum imaging depth should virtually appear exactly at the front edge of the comfortable viewing space, and objects that were exactly at the maximum imaging depth should virtually appear exactly at the back edge of the comfortable viewing space. We may draw an imaginary line at half way between the optical axis (i.e. the direction to the centrally located object at the maximum imaging depth) and the direction to the centrally located object at the minimum imaging depth for both cameras. These lines intersect at imaging depth 701 in FIG. 7. Similarly in the displayed three-dimensional image of FIG. 8, lines drawn exactly in the middle of the angle between the directions to the center of the front edge and the center of the back edge of the comfortable viewing space intersect exactly at the plane of the display screen 401. We may deduce that if the imaged scenery contained an object at imaging depth 701, that object would virtually appear in the plane of the display screen. Basic trigonometry could be used to derive an exact formula for the imaging depth 701, defined in terms of camera separation and the minimum and maximum imaging depths.

Concerning displays for which the maximum absolute value of disparity is not the same for objects appearing virtually in front of the screen and objects appearing virtually behind the screen, similar geometric considerations can be made. For example, if the absolute value of the maximum disparity for objects that virtually appear behind the screen is 3 mm and the absolute value of the maximum disparity for objects that virtually appear in front of the screen is 2 mm, instead of the simple half-way angle lines of FIGS. 7 and 8 we should draw lines in the middle that in each case divide the angle between the limiting directions into component angles that have the relative magnitudes of 3:2 instead of 1:1 as in FIGS. 7 and 8. The zero disparity plane would then be at the distance where these drawn lines intersect.

Figure 10:
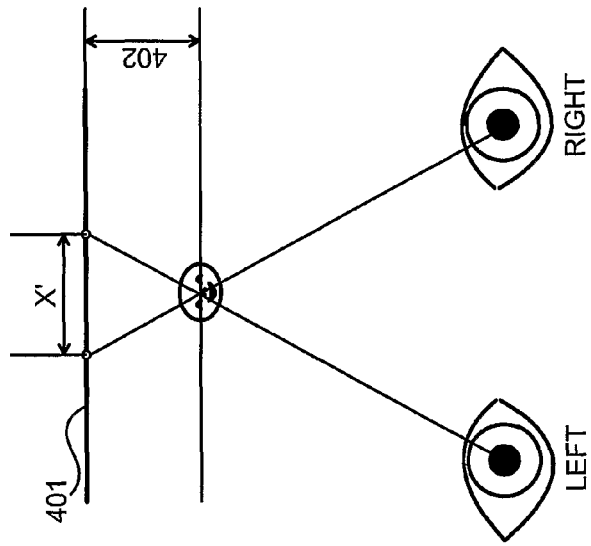
FIG. 10 illustrates subpixel separation associated with the image of a close object.
Figure 9:
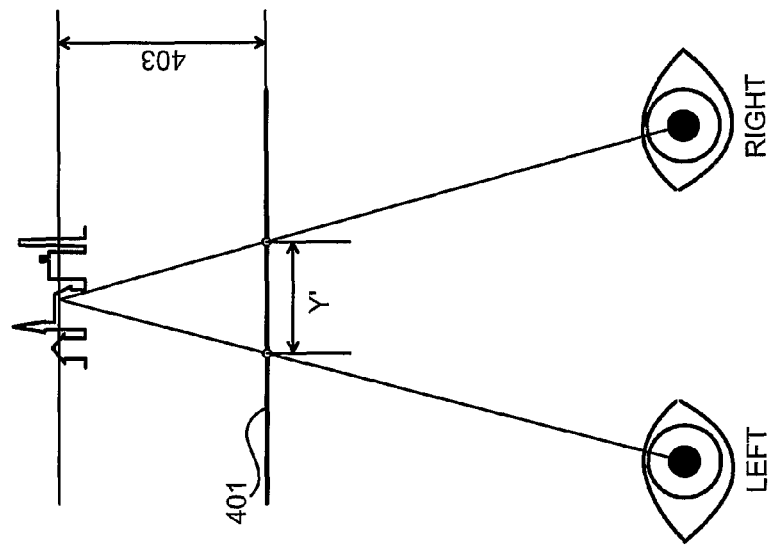
FIG. 9 illustrates subpixel separation associated with the image of a distant object.

FIGS. 9 and 10 illustrate defining the disparities for the most distant object and closest object in the displayed image respectively. In FIG. 9, to make an object virtually appear at the back edge of the comfortable viewing space, there should be a disparity the absolute value of which is Y' units between the left-eye and right-eye subpixels associated with said object. In FIG. 10, to make an object virtually appear at the front edge of the comfortable viewing space, there should be a disparity the absolute value of which is X' units. We must note that the sign of this disparity is opposite to the sign of the disparity associated with the most distant object. Selecting the signs of the disparities is just a matter of convention. Here we define that disparities where the left-eye subpixel is to the left of the right-eye subpixel are negative, and disparities where the left-eye subpixel is to the right of the right-eye subpixel are positive. If we make this selection, we must note that in the imaging arrangement of FIGS. 5 and 6 all disparities will have positive values (i.e. all objects closer than infinity will appear in the right-eye raw image more to the left than in the left-eye raw image).

In order to correctly map the image taken with the imaging arrangement of FIGS. 5 and 6 to the displaying arrangement of FIG. 8, we should thus construct a disparity mapping function that maps a disparity X between the raw images into a disparity X' between subpixels in the displayed image maps a disparity 0 (or more generally: a disparity associated with objects at the maximum imaging depth) between the raw images into a disparity −Y' between subpixels in the displayed image and linearly maps all disparities between the limiting values X and 0 between the raw images into corresponding disparities between the limiting values X' and −Y' between subpixels in the displayed image.

Linearly mapping a range of values into another range of values is a simple mathematical operation that only requires a scaling factor and a displacement value.

When handling digital images, the most natural unit of disparity is pixels. However, we must note that in general, the imaging arrangement has a different resolution and thus a different number of pixels in horizontal direction across the image than the displaying arrangement. This has to be taken into account in determining the scaling factor. Assuming that the maximum disparity (i.e. the disparity associated with the front edge of the comfortable viewing space) and the minimum disparity (i.e. the disparity associated with the back edge of the comfortable viewing space) of the displaying arrangement are $D_{out,max}$ and $D_{out,min}$ respectively, and that the maximum disparity (i.e. the disparity associated with the minimum imaging depth) and the minimum disparity (i.e. the disparity associated with the maximum imaging depth) of the imaging arrangement are $D_{in,max}$ and $D_{in,min}$ respectively, the most natural selection for the scaling factor SF is $$SF=(D_{out,max}-D_{out,min})/(D_{in,max}-D_{in,min}) \quad (1)$$

and the most natural selection for the displacement value DV is $$DV=(D_{out,min}D_{in,max}-D_{out,max}D_{in,min})/(D_{in,max}-D_{in,min}). \quad (2)$$

Alternatively we may express the amount ZD of how much the zero disparity plane should be displaced as $$ZD=(D_{in,max}+D_{in,min}-D_{out,max}-D_{out,min})/2. \quad (3)$$

As an example, an imaging arrangement might have $D_{in,max}=+60$ pixels and $D_{in,min}=0$ pixels, and a displaying arrangement might have $D_{out,max}=+10$ pixels and $D_{out,min}=-10$ pixels. Applying formulas (1) and (2) above, we get values SF=⅓ and DV=−10, so for any arbitrary disparity $D_{in}$ in the raw images we get the corresponding disparity $D_{out}$ in the displayed image as $$D_{out}=\tfrac{1}{3}*D_{in}-10. \quad (4)$$

A concept of displacing the zero disparity plane without scaling is the same as performing a mapping from input disparities to intermediate disparities, assuming that the number of pixels in horizontal direction across the image remains the same. Concerning processing order, it is possible to first displace the zero disparity plane without scaling and to thereafter scale the intermediate disparities into output disparities to take into account the different number of pixels in horizontal direction across the image. The other possibility is to scale first and displace the zero disparity plane thereafter. Of these two possibilities, the first-mentioned tends to produce more accurate results.

To be mathematically exact, we must note that the simple linear model above is an approximation, because exactly speaking the half-way angle between the direction to the closest possible object and the direction to the most distant possible object does not divide the corresponding width across the display into half. However, the difference between the linear approximation and the exact, sinusoidal relationship is so small taken the small angles that are involved in practice that it can be neglected.

For the purposes of the present invention it is important to note that the maximum and minimum disparities $D_{in,max}$ and $D_{in,min}$ that may occur in a pair of raw images does not depend on image content but only on the properties of the imaging arrangement. Similarly the maximum and minimum disparities $D_{out,max}$ and $D_{out,min}$ that correspond to objects virtually appearing at the front and back edge of the comfortable viewing space do not depend on image content but only on the properties of the displaying arrangement. Naturally relatively few images will actually include objects at the very minimum or the very maximum imaging depth but something in between, but it will then be on the responsibility of the displaying arrangement to find the corresponding disparity values that will fall between the extreme limits.

For the purposes of the present invention it should also be noted that the actual process of interlacing, in which the displaying arrangement detects the pixels that represent close or distant objects and consequently associates each pixel pair in the raw images with the appropriate disparity value, is not important to the invention. Several known algorithms exist for comparing the raw images and finding the pixels that represent the same point in the imaged scenery although they appear horizontally displaced in the raw images. The present invention concerns the question of how does the displaying arrangement define the mapping function that maps an input disparity, once found, to an output disparity that will determine the horizontal distance between the left-eye and right-eye subpixels.

FIG. 11 illustrates a data flow process according to an embodiment of the invention when three-dimensional digital image data is transferred from a transmitting device 1101 to a receiving device 1102 and subsequently displayed on a display 1103 coupled to the receiving device 1102. FIG. 12 illustrates an example of certain functional blocks of said devices that may take part in preparing, transferring, processing and outputting the image data.

The transmitting device 1101 transmits the raw images and an indication of an associated disparity range to the receiving device. In the example of FIG. 12 we assume that the transmitting device is also the originator of the three-dimensional image data, for which purpose it comprises at least two parallel cameras 1201. The raw images taken by the cameras are stored in an image memory 1202. Characteristics of the imaging arrangement, such as camera properties, camera separation, general image properties, possible standardized minimum and maximum imaging depth are stored in a characteristics memory 1203. A control means (controller) 1204 is provided in the transmitting device for enabling a user to control the operations of taking, handling and transmitting three-dimensional images. For transmitting raw images and the associated disparity ranges to outside of the transmitting device there is provided output means (output module) 1205, which in the case of a portable communications device typically include a wireless transceiver. The cameras 1201, the image memory 1202 and the characteristics memory 1203 or a part of these functional blocks could be implemented as an imaging module that can be manufactured and sold separately for installing to various kinds of electronic devices.

In the simplest possible case the imaging characteristics of the transmitting device are constant: the cameras are fixedly located in the transmitting device, they have a fixed focal length, the minimum and maximum imaging depths are constant and so on. In that case it is particularly simple to store indications of the maximum and minimum disparity values associated with a pair of raw images, because also said maximum and minimum disparity values will be constant. However, it is possible that the cameras are equipped with zoom objectives or exchangeable lenses that change the focal length, or the aperture or separation between cameras can be changed, or there may be more than two cameras so that the user may select which of them to use, or some other imaging characteristic is not constant. For such cases it is useful to have a coupling from the control means 1204 to the characteristics memory 1203 so that whatever changes the user makes to the imaging arrangement, always the most appropriate corresponding indications of the maximum and minimum disparity values may be read from the characteristics memory 1203 and transmitted along with the raw images. The coupling from the control means 1204 to the characteristics memory 1203 may be also indirect, so that when the user changes focal length or other imaging characteristic, the imaging arrangement produces an indication of the change that causes a subsequent read operation in the characteristics memory to find the most appropriate information.

The nature and content of the indication of the maximum and minimum disparity values may also vary. The most straightforward alternative is to express the maximum and minimum disparity values in the units of pixels that have one-to-one correspondence with the horizontal pixel count in the raw images, and transmit the explicit values along with the raw images. It is also possible to use some other units than pixels. Another alternative is that the transmitting device already compares the raw images enough to find the pixel pairs that correspond to the closest image point and the most image point; then the transmitting device could specifically identify these pixels in the raw images rather than announce any measure of their separation. Yet another alternative may be used if the imaging characteristics of the transmitting device are constant. The maximum and minimum disparity values typical to each commonly known type of transmitting device could be standardized, so that the transmitting device only needed to transmit an indication of its type. A receiving device could then consult some previously stored look-up table that associates imaging device types with their characteristic maximum and minimum disparity values. Yet another alternative is that the transmitting device transmits geometric details about the imaging arrangement along with the raw images, such as the maximum and minimum imaging depths, focal length, CCD size and/or others, from which a receiving device in turn can derive the appropriate maximum and minimum disparity values of the original imaging arrangement. Yet another alternative is to define that the minimum disparity between the raw image is always zero or some other constant value, so that no indication of minimum disparity needs to be transmitted. Constantly assuming a zero minimum disparity is synonymous to assuming that the two optical axes always intersect at the maximum imaging depth, which may but does not have to be infinity.

Whatever is the nature and content of the indication of the maximum and minimum disparity values, the receiving device 1102 receives it along with the raw images through a receiver 1211. The raw image data goes to an image processor 1212, where it waits to be processed while a disparity mapper 1213 prepares the mapping between disparity values in the raw images and disparity values for the interlaced images to be displayed. In order to perform the mapping, the disparity mapper 1213 must know the disparity range associated with the raw images, as well as the allowable disparity range that may appear eventually in the displayed image. If the latter is constant, the disparity mapper 1213 may simply read it from a characteristics memory 1214. Otherwise the disparity mapper 1213 may calculate the disparity range allowable in the displayed image from stored information such as display size, display pixel pitch, and human ergonomic factors of the display (including default viewing distance). If the receiving device can be coupled to a variety of displays, it is advisable to arrange storing the appropriate, display-dependent values to the characteristics memory 1214 at the time when a new display is coupled. Most advantageously the receiving device 1102 comprises also control means 1215 through which a user may input his preferences about increasing or decreasing the disparity range allowable in the displayed image.

Once the disparity range allowable in the displayed image is known, the disparity mapper 1213 may use it and its knowledge about the original disparity range associated with the raw images to produce the mapping function (see e.g. formulas (1)-(4) above), which it delivers to the image processor 1212. The task of the image processor 1212 is ultimately to convert the raw images into the new image pair that will be conveyed to the display 1103. This converting may include scaling and cropping of the images as well as making the changes to disparity pixel-wise. Cropping is needed because displacing the zero disparity plane effectively moves the background of each raw image sideways so that information is lost from a vertical bar at each side edge of the image. This vertical bars must be cut out. Also in many cases the proportions of the raw images are not the same as the proportions of the display, which means that either the image must be cropped to fit to the display or empty fields must be added to some sides of the image.

As we have pointed out earlier, for the present invention it is not important, what algorithm the image processor 1212 uses to identify mutually corresponding pixels in the raw images. The invention affects the changes to be made in disparity: once the image processor 1212 has found a pixel pair with some initial disparity $D_{in}$ in the raw images, it relocates the pixels of that pixel pair in the new images so that their new disparity is calculated according to the mapping formula that is based on knowing the initial disparity range as well as the disparity range allowable in the displayed image.

The display 1103 is shown to comprise the interlacing means (interlacing module) 1221 that directs the new images prepared in the image processor 1212 to the arrays of subpixels that constitute the display screen 1222.

Figure 13:
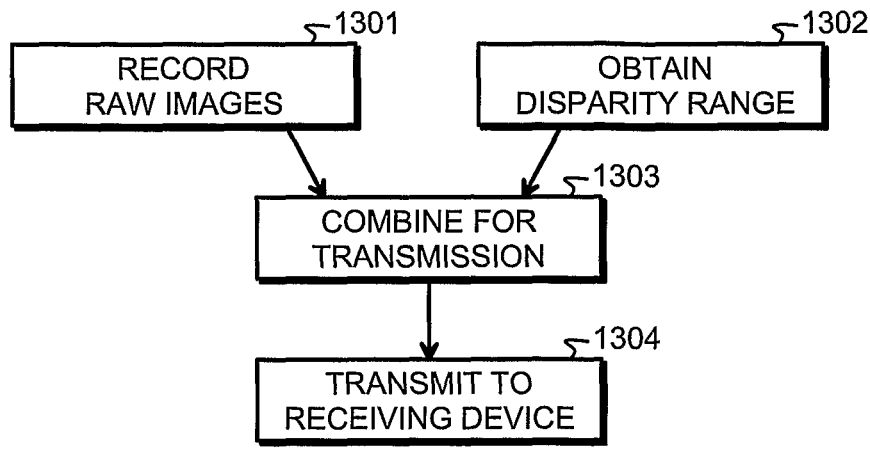
FIG. 13 illustrates a method and a software program product executed by a transmitting device.
Figure 14:
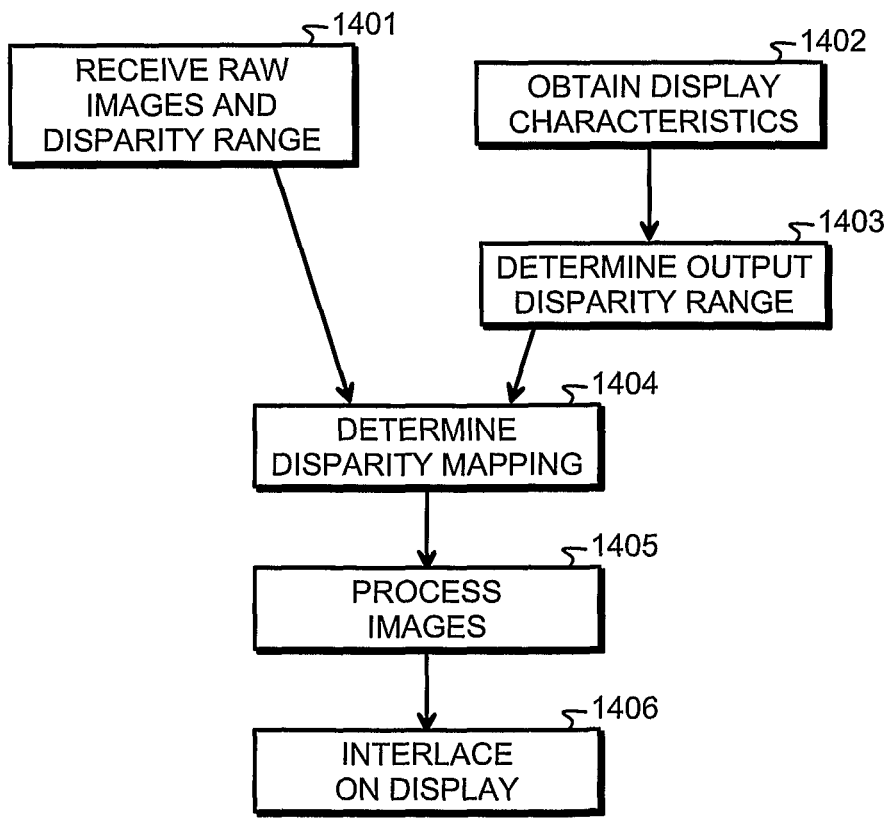
FIG. 14 illustrates a method and a software program product executed by a receiving device and a display.

FIGS. 13 and 14 illustrate the methods performed at the transmitting and receiving ends respectively. The drawings may also be considered as illustrations of the software program products employed at the transmitting and receiving ends. At step 1301 the transmitting device records the raw images, and at step 1302 it obtains an indication of the disparity range, i.e. the maximum and minimum disparity values associated with the raw images. At step 1303 the transmitting device combines the raw images and the indication of the disparity range for transmission, and at step 1304 it transmits them to a receiving device.

The receiving device receives the raw images and the indication of the disparity range associated with the raw images at step 1401. It obtains information about the display characteristics at step 1402 and uses that information to determine the disparity range allowable in the displayed image at step 1403. At step 1404 the receiving device uses the information it has about the raw image disparity range and the output image disparity range to determine the appropriate disparity mapping. At step 1405 the images are processed, which includes relocating the pixels in the horizontal direction according to the disparity mapping function determined in the previous step. Depending on what display technology and image file standard is to be used, the processing step 1405 may include format conversion operations such as those explained for example in the prior art publication US 2004/0218269 A1. For example, if the image is to be displayed on a parallax barrier display of Sharp Electronics Corporation, the left-eye and right-eye subimages are compressed in horizontal direction by a factor 2 and written side by side into a single image file that follows otherwise the JPEG (Joint Photographic Experts Group) standard but has a certain additional character string in its header and an extension .stj in its file name. At 1406 the completed new images are output on the display.

The exemplary embodiments described above should not be construed as limiting. For example, even if we have consistently considered using only two cameras, the invention does not exclude using three or more cameras. In a multi-camera arrangement the concept of disparity must be replaced with a more generally defined horizontal displacement of pixels depending on imaging depth, but otherwise the principle of the invention can be applied in a straightforward manner. For each camera there can be defined the characteristic horizontal displacements associated with objects at the minimum imaging depth and the maximum imaging depth on the central line of sight of the imaging arrangement. These characteristic horizontal displacements take the position of maximum and minimum disparities associated with a raw image pair in the description above. Also even if we have considered solely still images so far, it should be noted that the principle of the invention is also applicable to the obtaining, transmitting, processing and displaying of series of images, which as a sequence constitute a video signal. Since the initial disparity range is a property of the imaging arrangement and does not depend on image content, applying the invention to the processing of a video signal is particularly simple: the indication of the initial disparity range only needs to be transmitted once unless the characteristics of the imaging arrangement are dynamically changed during shooting, in which case the indication of the disparity range needs to be transmitted regularly so that it covers each change.

Yet another exemplary modification concerns the implementation of the cameras: instead of the (at least) two parallel cameras it is possible to equip a single camera (i.e. a single CCD array) with a branching lens system that sets up two parallel optical paths and includes a shutter system that allows taking a picture through each optical path in turn. Additionally, even if we have used the term "raw image" to generally describe an image taken along one optical path and transmitted to a receiving device, this does not mean that the transmitted image should be "raw" in the sense that it would not have undergone any changes or processing after having read from the CCD array. Normal image processing can be applied, like color and brightness correction, computed corrections to remove undesired optical effects, and the like. However, care must be taken not to delete information that is important to the reconstruction of a stereographic image. For example, image compression according to the JPEG format may average out adjacent pixels, which means that if such image compression were to be applied at an inappropriate phase of handling stereographic images, it might destroy the stereographic properties altogether.

The numeric values used in the description are exemplary. For example, even if at the time of writing the description the default viewing distance of the autostereographic displays of portable devices is in the order of 40-60 cm, other displays may involve shorter or longer default viewing distances. Displays for use in personal computers have usually longer default viewing distances, up to 1-2 meters. Much longer default viewing distances occur in audiovisual presentation systems like 3D cinemas.

What is claimed is:

1. A device comprising a stereographic imaging arrangement configured to take a first raw image along a first optical axis and a second raw image along a second optical axis for obtaining three-dimensional digital image data, wherein:

the first and second optical axes have a horizontal separation at the imaging arrangement, and the imaging arrangement has a maximum imaging depth and a minimum imaging depth; and a controller configured to cause the device to perform:
defining a maximum disparity value of a difference between a location in the first raw image that represents the minimum imaging depth and a location in the second raw image that represents the minimum imaging depth,
defining a minimum disparity value of a difference between a location in the first raw image that represents the maximum imaging depth and a location in the second raw image that represents the maximum imaging depth
transmitting the first raw image and the second raw image along with an indication of a disparity range between the maximum disparity value and the minimum disparity value.

2. The device according to claim 1, wherein in order to transmit said indication of a disparity range, the device is configured to transmit a maximum disparity in pixels between a location in the first raw image that represents the minimum imaging depth and a location in the second raw image that represents the minimum imaging depth.

3. The device according to claim 2, wherein the device is further configured to transmit a minimum disparity in pixels between a location in the first raw image that represents the maximum imaging depth and a location in the second raw image that represents the maximum imaging depth.

4. The device according to claim 1, wherein in order to transmit said indication of a disparity range, the device is configured to transmit an identifier of at least one of a type of the device or a type of the imaging arrangement.

5. The device according to claim 1, wherein the controller being further configured to cause the device to perform changing optical characteristics of the imaging arrangement, and the device further comprising:
an image memory arranged to store the first raw image and the second raw image, and
a characteristics memory configured to output said indication of a disparity range for transmission;
wherein said characteristics memory is configured to respond to changes made to the optical characteristics of the imaging arrangement by outputting an indication of a disparity range that corresponds to the changes made.

6. The device according to claim 1, wherein it is a portable communications device and comprises an output module configured to transmit the first raw image, the second raw image and the indication of the disparity range to the receiving device through a wireless communications network.

7. An imaging module comprising:
a stereographic imaging arrangement, comprising cameras, configured to take a first raw image along a first optical axis and a second raw image along a second optical axis;
wherein:
the imaging module is configured to store the first raw image and the second raw image to an image memory and an indication of a disparity range between a maximum disparity value and a minimum disparity value to a characteristics memory,
the maximum disparity value is a measure of a difference between a location in the first raw image that represents a minimum imaging depth and a location in the second raw image that represents the minimum imaging depth, wherein said minimum imaging depth is a feature of said imaging arrangement and
the minimum disparity value is a measure of a difference between a location in the first raw image that represents a maximum imaging depth and a location in the second raw image that represents the maximum imaging depth, wherein said maximum imaging depth is a feature of said imaging arrangement.

8. The imaging module according to claim 7, wherein in order to store said indication of a disparity range, the imaging module is configured to store a maximum disparity in pixels between a location in the first raw image that represents the minimum imaging depth and a location in the second raw image that represents the minimum imaging depth.

9. The imaging module according to claim 8, wherein the imaging module is further configured to store a minimum disparity in pixels between a location in the first raw image that represents the maximum imaging depth and a location in the second raw image that represents the maximum imaging depth.

10. The imaging module according to claim 7, wherein in order to store said indication of a disparity range, the imaging module is configured to store an identifier of at least one of a type of the imaging module or a type of the imaging arrangement.

11. An imaging module comprising:
a stereographic imaging arrangement configured to take a first raw image along a first optical axis and a second raw image along a second optical axis;
wherein:
the imaging module is configured to store the first raw image and the second raw image to an image memory and configured to obtain and store an indication of a disparity range between a maximum disparity value and a minimum disparity value to a characteristic memory,
the maximum disparity value is a measure of a difference between a location in the first raw image that represents a minimum imaging depth and a location in the second raw image that represents the minimum imaging depth, wherein said minimum imaging depth is a feature of said imaging arrangement and
the minimum disparity value is a measure of a difference between a location in the first raw image that represents a maximum imaging depth and a location in the second raw image that represents the maximum imaging depth, wherein said maximum imaging depth is a feature of said imaging arrangement.

12. The imaging module according to claim 11, wherein in order to store said indication of a disparity range, the imaging module is configured to store to said characteristics memory a maximum disparity in pixels between a location in the first raw image that represents the minimum imaging depth and a location in the second raw image that represents the minimum imaging depth.

13. The imaging module according to claim 12, wherein the imaging module further is configured to store to said characteristics memory a minimum disparity in pixels between a location in the first raw image that represents the maximum imaging depth and a location in the second raw image that represents the maximum imaging depth.

14. The imaging module according to claim 11, wherein in order to store said indication of a disparity range, the imaging module is configured to store to said characteristics memory an identifier of at least one of a type of the imaging module or a type of the imaging arrangement.

15. A device comprising a receiver; wherein:
the device is configured to receive from a transmitting device a first raw image and a second raw image along with an indication of a disparity range between a maximum input disparity value and a minimum input disparity value, said maximum input disparity value is a measure of a difference between a location in the first raw image that represents a minimum imaging depth of an imaging arrangement and a location in the second raw image that represents the minimum imaging depth, and the minimum disparity value is a measure of a difference between a location in the first raw image that represents a maximum imaging depth of the imaging arrangement and a location in the second raw image that represents the maximum imaging depth.

16. The device according to claim 15, wherein as said indication of a disparity range between a maximum input disparity value and a minimum input disparity value, the device is configured to receive a maximum disparity in pixels between a location in the first raw image that represents the minimum imaging depth and a location in the second raw image that represents the minimum imaging depth.

17. The device according to claim 16, wherein the device is further configured to receive a minimum disparity in pixels between a location in the first raw image that represents the maximum imaging depth and a location in the second raw image that represents the maximum imaging depth.

18. The device according to claim 15, wherein:
as said indication of a disparity range between a maximum input disparity value and a minimum input disparity value, the device is configured to receive an identifier of at least one of a type of the transmitting device or a type of an imaging arrangement used to produce the first and second raw images, and the device is configured to derive, from the received indication, a maximum disparity in pixels between a location in the first raw image that represents the minimum imaging depth and a location in the second raw image that represents the minimum imaging depth and a minimum disparity in pixels between a location in the first raw image that represents the maximum imaging depth and a location in the second raw image that represents the maximum imaging depth.

19. The device according to claim 15, wherein:
the device is configured to store a maximum output disparity value and a minimum output disparity value, of which the maximum output disparity value is a measure of a difference in location between two output subpixels that represent a virtual distance in front of a display screen, and the minimum output disparity value is a measure of a difference in location between two output subpixels that represent a virtual distance behind the display screen and the device is configured to perform a linear mapping from input disparities in the first and second raw images that are between the maximum input disparity value and the minimum input disparity value to output disparities that are between the maximum output disparity value and the minimum output disparity value, in order to find locations for output subpixels to be displayed on an autostereographic display.

20. The device according to claim 19, wherein it comprises a controller configured to convert input information given by a user into changes of at least one of the maximum output disparity value and the minimum output disparity value.

21. The device according to claim 15, wherein the device comprises an autostereographic display for displaying a three-dimensional image derived from the first and second raw images and the indication of the disparity range.

22. An image transmission system comprising a transmitting device and a receiving device, of which the transmitting device comprises a stereographic imaging arrangement configured to take a first raw image along a first optical axis and a second raw image along a second optical axis, and the receiving device comprises a receiver, wherein:
the transmitting device and the receiving device are configured to exchange the first raw image and the second raw image and an indication of a disparity range between a maximum disparity value and a minimum disparity value, the maximum disparity value is a measure of a difference between a location in the first raw image that represents minimum imaging depth of the imaging arrangement and a location in the second raw image that represents the minimum imaging depth, and the minimum disparity value is a measure of a difference between a location in the first raw image that represents a maximum imaging depth of the imaging arrangement and a location in the second raw image that represents the maximum imaging depth.

23. The image transmission system according to claim 22, wherein in order to exchange said indication of a disparity range, the transmitting device and the receiving device are configured to exchange a maximum disparity in pixels between a location in the first raw image that represents the minimum imaging depth and a location in the second raw image that represents the minimum imaging depth.

24. The image transmission system according to claim 23, wherein the transmitting device and the receiving device are further configured to exchange a minimum disparity in pixels between a location in the first raw image that represents the maximum imaging depth and a location in the second raw image that represents the maximum imaging depth.

25. The imaging module according to claim 22, wherein in order to exchange said indication of a disparity range, the transmitting device and the receiving device are configured to exchange an identifier of at least one of a type of the imaging module or a type of the imaging arrangement.

26. A method for obtaining three-dimensional digital image data in a device, comprising:
taking a first raw image along a first optical axis, using a stereographic imaging arrangement of the device;
taking a second raw image along a second optical axis, using the stereographic imaging arrangement of the device;
defining an indication of a disparity range between a maximum disparity value and a minimum disparity value, wherein the maximum disparity value is a measure of a difference between a location in the first raw image that represents a minimum imaging depth of the imaging arrangement used to produce the first and second raw images and a location in the second raw image that represents the minimum imaging depth, and the minimum disparity value is a measure of a difference between a location in the first raw image that represents a maximum imaging depth of the imaging arrangement and a location in the second raw image that represents the maximum imaging depth; and
transmitting the first raw image and the second raw image along with the indication of a disparity range.

27. The method according to claim 26, comprising transmitting a maximum disparity in pixels between a location in the first raw image that represents the minimum imaging depth and a location in the second raw image that represents the minimum imaging depth, in order to transmit said indication of a disparity range.

28. The method according to claim 27, further comprising transmitting a minimum disparity in pixels between a location in the first raw image that represents the maximum imaging depth and a location in the second raw image that represents the maximum imaging depth.

29. The method according to claim 26, comprising transmitting an identifier of at least one of a type of the device or a type of the imaging arrangement, in order to transmit said indication of a disparity range.

30. A method for receiving and processing three-dimensional digital image data, comprising:
receiving, using a receiver of a device, a first raw image taken along a first optical axis,
receiving, using the receiver of the device, a second raw image taken along a second optical axis;
receiving, using the receiver of the device, an indication of a disparity range between a maximum input disparity value and a minimum input disparity value, wherein the maximum input disparity value is a measure of a difference between a location in the first raw image that represents a minimum imaging depth of an imaging arrangement used to produce the first and second raw images and a location in the second raw image that represents the minimum imaging depth, and the minimum input disparity value is a measure of a difference between a location in the first raw image that represents a maximum imaging depth of the imaging arrangement and a location in the second raw image that represents the maximum imaging depth;
preparing, by a disparity mapper, a mapping between disparity values in the raw images and disparity values for interlaced images using the indication of a disparity range; and
converting, by an image processor, the interlaced images for displaying.

31. The method according to claim 30, wherein in order to find locations for output subpixels to be displayed on an autostereographic display the method comprises linearly mapping input disparities in the first and second raw images that are between the maximum input disparity value and the minimum input disparity value into output disparities that are between a maximum output disparity value and a minimum output disparity value, of which the maximum output disparity value is a measure of a difference in location between two output subpixels that represent a virtual distance in front of a display screen, and the minimum output disparity value is a measure of a difference in location between two output subpixels that represent a virtual distance behind the display screen.

32. The method according to claim 31, wherein for displaying said output subpixels on an autostereographic display a default viewing distance of which is between 20 and 60 centimeters, the method comprises using a maximum output disparity value and a minimum output disparity value the absolute values of which are between 2 and 10 millimeters.

33. The method according to claim 31, comprising changing the value of at least one of the maximum output disparity value and the minimum output disparity value in response to control inputs given by a user.

34. A memory stored with instructions such that when executed in a computer, causes the computer to:
transmit a first raw image taken along a first optical axis;
transmit a second raw image taken along a second optical axis; and
transmit an indication of a disparity range between a maximum disparity value and a minimum disparity value, wherein the maximum disparity value is a measure of a difference between a location in the first raw image that represents a minimum imaging depth of an imaging arrangement used to produce the first and second raw images and a location in the second raw image that represents the minimum imaging depth, and the minimum disparity value is a measure of a difference between a location in the first raw image that represents a maximum imaging depth of the imaging arrangement and a location in the second raw image that represents the maximum imaging depth.

35. The memory stored with instructions according to claim 34, wherein the instructions when executed in a computer, causing the computer to transmit a maximum disparity in pixels between a location in the first raw image that represents the minimum imaging depth and a location in the second raw image that represents the minimum imaging depth, in order to transmit said indication of a disparity range.

36. The memory stored with instructions according to claim 35, wherein the instructions when executed in a computer, causing the computer to transmit a minimum disparity in pixels between a location in the first raw image that represents the maximum imaging depth and a location in the second raw image that represents the maximum imaging depth.

37. The memory stored with instructions according to claim 34, wherein the instructions when executed in a computer, causing the computer to transmit an identifier of at least one of a type of the device or a type of the imaging arrangement, in order to transmit said indication of a disparity range.

38. A memory stored with instructions such that when executed in a computer, cause the computer to:
receive a first raw image taken along a first optical axis;
receive a second raw image taken along a second optical axis; and
receive an indication of a disparity range between a maximum input disparity value and a minimum input disparity value, wherein the maximum input disparity value is a measure of a difference between a location in the first raw image that represents a minimum imaging depth of an imaging arrangement used to produce the first and second raw images and a location in the second raw image that represents the minimum imaging depth, and the minimum input disparity value is a measure of a difference between a location in the first raw image that represents a maximum imaging depth of the imaging arrangement and a location in the second raw image that represents the maximum imaging depth.

39. The memory stored with instructions according to claim 38, wherein in order to find locations for output subpixels to be displayed on an autostereographic display, wherein said instructions when executed in a computer, cause the computer to map input disparities in the first and second raw images that are between the maximum input disparity value and the minimum input disparity value into output disparities that are between a maximum output disparity value and a minimum output disparity value, of which the maximum output disparity value is a measure of a difference in location between two output subpixels that represent a virtual distance in front of a display screen, and the minimum output disparity value is a measure of a difference in location between two output subpixels that represent a virtual distance behind the display screen.

40. The memory stored with instructions according to claim 39, wherein for displaying said output subpixels on an autostereographic display a default viewing distance of which is between 20 and 60 centimeters, wherein said instructions when executed in a computer, cause the computer to use a maximum output disparity value and a minimum output disparity value the absolute values of which are between 2 and 10 millimeters.

41. The memory stored with instructions according to claim 39, wherein said instructions when executed in a computer, cause the computer to change the value of at least one of the maximum output disparity value and the minimum output disparity value in response to control inputs given by a user.

42. A device comprising:
- means for taking a first raw image along a first optical axis and a second raw image along a second optical axis, wherein:
- the first and second optical axes have a separation at the imaging arrangement,
- the imaging arrangement has a maximum imaging depth and a minimum imaging depth;
- the device further comprising means for transmitting the first raw image and the second raw image to a receiving device along with an indication of a disparity range between a maximum disparity value and a minimum disparity value,
- the maximum disparity value is a measure of a difference between a location in the first raw image that represents the minimum imaging depth and a location in the second raw image that represents the minimum imaging depth, and
- the minimum disparity value is a measure of a difference between a location in the first raw image that represents the maximum imaging depth and a location in the second raw image that represents the maximum imaging depth.

* * * * *

UNITED STATES PATENT AND TRADEMARK OFFICE
CERTIFICATE OF CORRECTION

PATENT NO.       : 8,619,121 B2                                          Page 1 of 1
APPLICATION NO.  : 12/085124
DATED            : December 31, 2013
INVENTOR(S)      : Lachlan Pockett It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1209 days.

Signed and Sealed this
Twenty-second Day of September, 2015

Michelle K. Lee
*Director of the United States Patent and Trademark Office*